(12) United States Patent
Koren et al.

(10) Patent No.: US 8,843,453 B2
(45) Date of Patent: Sep. 23, 2014

(54) VALIDATING DOCUMENTS USING RULES SETS

(75) Inventors: Nir Koren, Ra annana (IL); Inbal Sabag, Kfar Saba (IL)

(73) Assignee: SAP Portals Israel Ltd, Ra'anana (IL)

( * ) Notice: Subject to any disclaimer, the term of this patent is extended or adjusted under 35 U.S.C. 154(b) by 1 day.

(21) Appl. No.: 13/614,139

(22) Filed: Sep. 13, 2012

(65) Prior Publication Data

US 2014/0074806 A1  Mar. 13, 2014

(51) Int. Cl.
*G06F 17/30* (2006.01)
*G06F 17/27* (2006.01)

(52) U.S. Cl.
CPC ...... *G06F 17/30303* (2013.01); *G06F 17/2725* (2013.01)
USPC ............ 707/690; 707/694; 715/256; 715/257

(58) Field of Classification Search
CPC ....................... G06F 17/30303; G06F 17/2725
USPC ............................ 707/690, 694; 715/256, 257
See application file for complete search history.

(56) References Cited

U.S. PATENT DOCUMENTS

| | | | | |
|---|---|---|---|---|
| 2002/0007405 | A1* | 1/2002 | Bahadur | 709/218 |
| 2002/0078134 | A1* | 6/2002 | Stone et al. | 709/202 |
| 2002/0174185 | A1* | 11/2002 | Rawat et al. | 709/206 |
| 2003/0088627 | A1* | 5/2003 | Rothwell et al. | 709/206 |
| 2004/0268304 | A1* | 12/2004 | Kuo et al. | 717/109 |
| 2005/0097179 | A1* | 5/2005 | Orme | 709/207 |
| 2008/0114583 | A1* | 5/2008 | Al-Onaizan et al. | 704/2 |
| 2008/0132226 | A1* | 6/2008 | Carnall | 455/425 |
| 2010/0125447 | A1* | 5/2010 | Goswami | 704/8 |
| 2010/0179802 | A1* | 7/2010 | Best et al. | 704/2 |
| 2012/0159420 | A1 | 6/2012 | Yassin et al. | |
| 2012/0254181 | A1* | 10/2012 | Schofield et al. | 707/737 |

OTHER PUBLICATIONS

MacRumors, Turn off Auto correct but keep spell checker, Jan. 2011.*
XMetaL Community Forums, Faster spell checking by skipping certain elements, 2009.*

* cited by examiner

*Primary Examiner* — William Spieler
(74) *Attorney, Agent, or Firm* — Fish & Richardson P.C.

(57) ABSTRACT

The disclosure generally describes computer-implemented methods, software, and systems for detecting and correcting errors in documents. A computer-implemented method includes: (i) identifying a string policy enforcement rules set associated with at least one set of documents, each rule in the rules set including one or more specific rule strings and instructions relating to string-based policies; (ii) identifying at least one document containing at least one string, the at least one identified document associated with at least one rule included in the identified string policy enforcement rules set; and (iii) validating the at least one identified document, wherein validating the at least one identified document includes validating the at least one string in the at least one identified document using the at least one rule from the string policy enforcement rules set associated with the at least one identified document.

19 Claims, 4 Drawing Sheets

VALIDATING DOCUMENTS USING RULES SETS

TECHNICAL FIELD

The present disclosure relates to computer-implemented methods, software, and systems for detecting and correcting errors in documents.

BACKGROUND

Software and software-related documents and materials may be generated and updated by engineers, technical writers, and other people, as well as automatically by software development systems. Over time, errors can be introduced, such as typographical errors, grammatical errors, misspelled words and/or incorrect punctuation. Some words may be correct in native usage and spelling, but may be known to be become a problem upon translation to another language. Errors can be corrected manually or automatically, and the time at which the error is detected during a development or production cycle can determine the cost of finding and correcting the error, or the ultimate cost of the error if it is not detected at an opportune time.

SUMMARY

The disclosure generally describes computer-implemented methods, software, and systems for detecting and correcting errors in documents. For example, the documents can be software and/or software-related documentation.

The present disclosure relates to computer-implemented methods, software, and systems for using rule sets to enforce string policies. One computer-implemented method includes: (i) identifying a string policy enforcement rules set associated with at least one set of documents, each rule in the rules set including one or more specific rule strings and instructions relating to string-based policies; (ii) identifying at least one document containing at least one string, the at least one identified document associated with at least one rule included in the identified string policy enforcement rules set; and (iii) validating the at least one identified document, wherein validating the at least one identified document includes validating the at least one string in the at least one identified document using the at least one rule from the string policy enforcement rules set associated with the at least one identified document.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation can include all the following features:

In a first aspect combinable with any of the previous aspects, identifying the string policy enforcement rules set includes initially identifying the at least one document containing the at least one string, and identification of the string policy enforcement rules set is based at least in part on the at least one document or metadata associated with the at least one document.

In a second aspect combinable with any of the previous aspects, the method further comprises separating the at least one document into a first document and a second document, and each of the first document and the second document is associated with a different rule from the string policy enforcement rule set.

In a third aspect combinable with any of the previous aspects, the documents include software and/or software-related documentation used in a software development life cycle.

In a fourth aspect combinable with any of the previous aspects, the string policy enforcement rules set includes rules from different sources, including rules from at least one of an Extensible Markup Language (XML) file, text file and/or database.

In a fifth aspect combinable with any of the previous aspects, the rules include rules associated with particular languages, including rules associated with words or terms that are problematic in certain business areas, cultures or languages.

In a sixth aspect combinable with any of the previous aspects, the rules include rules related to detection and correction of grammar, punctuation, spelling and typographical errors.

In a seventh aspect combinable with any of the previous aspects, the method further comprises receiving an on/off stop setting for a stop command associated with validating the at least one identified document, the stop command including at least one stop condition associated with one or more strings in the document, and when the on/off setting is on, terminating the validating of the at least one identified document if at least one of the stop conditions is determined.

In an eighth aspect combinable with any of the previous aspects, validating the at least one identified document is integrated within at least one other system selected from a group comprising source code management, integrated development environments, language translations, and software-related builds.

In a ninth aspect combinable with any of the previous aspects, the method further comprises updating the document automatically when the validating identifies at least one undesirable string.

In a tenth aspect combinable with any of the previous aspects, updating the document automatically includes deleting, replacing or correcting an undesirable string in the document based at least on patterns defined in one or more rules in the rules set.

In an eleventh aspect combinable with any of the previous aspects, updating the document occurs when an auto-fix setting is enabled, otherwise when the auto-fix setting is disabled, flagging an undesirable string for manual review.

The subject matter described in this specification can be implemented in particular implementations so as to realize one or more of the following advantages. First, translation costs can be saved by detecting and correcting errors in documents before the documents are translated, e.g., into different languages. Second, verification and validation can occur just in time, thus saving costs associated with the production of documents.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

This disclosure generally describes computer-implemented methods, software, and systems for detecting and correcting undesirable strings (e.g., words, phrases, etc.) in documents. For example, a set of documents can include several components of computer software revised by software engineers and that are part of a software build. The documents, for example, may include computer code that generates part of a user interface and may contain undesirable strings, such as words or phrases introduced by the software engineers that are not desired. The documents may also include, for example, software documentation and manuals, user interface elements associated with the computer software, and any other suitable software-related text or strings. A string validation process can access rules in a rules set and use the rules to determine the undesirable strings. In some cases, corrections to the undesirable strings can occur automatically using the rules. In other cases, the undesirable strings can be flagged for correction at a later time. In either instance, the present disclosure can assist in the detecting and correcting of undesirable or incorrect strings to reduce development costs and user review time.

Figure 1:
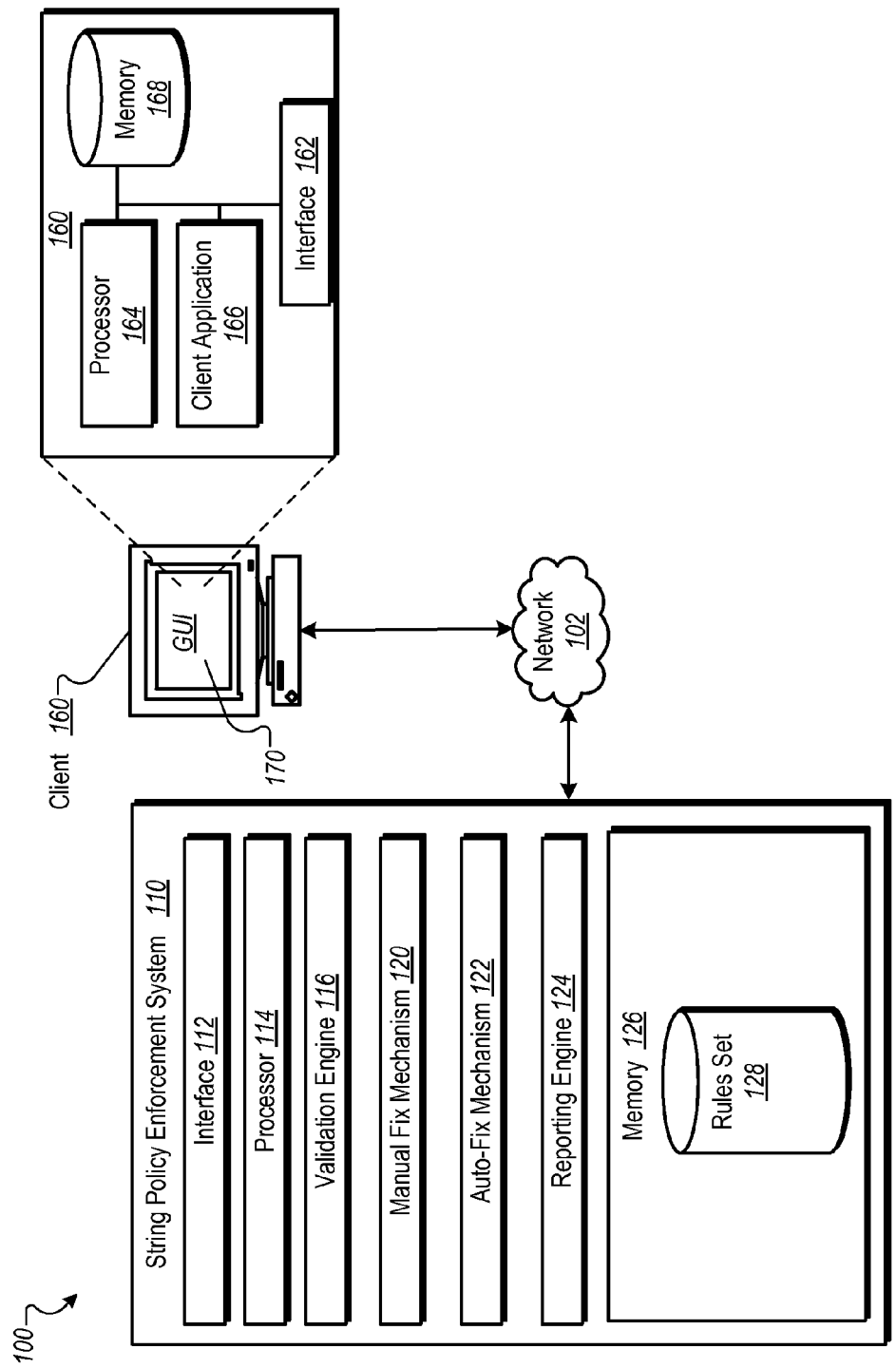
FIG. 1 is a block diagram illustrating an example environment for validating documents using a string policy enforcement rules set.

FIG. 1 illustrates an example environment 100 for validating documents using a string policy enforcement rules set. Specifically, the illustrated environment 100 includes, or is communicably coupled with, a string policy enforcement system 110 and a client device 160. For example, a user interacting with user interfaces presented on the client device 160 may access and/or generate documents for which information in the documents is validated, corrected and reported on by the string policy enforcement system 110.

At a high level, the string policy enforcement system 110 comprises an electronic computing device operable to validate documents using at least a rules set 128. The documents may be received from one or more client devices 160, or the documents may be validated elsewhere within the environment 100. The string policy enforcement system 110 can also provide reporting features, e.g., to provide information associated with documents that have been verified and the errors that have been detected and/or corrected.

The rules set 128, together with functions that execute based on one or more rules from the rules set 128, can serve as a mechanism for enforcing documentation, language and usage policies of an organization. The result is a data-driven mechanism that can prevent undesirable or problematic strings from be added to software that being developed. Rules in the rules set can include, for example, string-related, spelling and usage rules that are configurable and predefined for the string policy enforcement system 110. For example, the rules may be defined and/or implemented using various mechanisms, such as Extensible Markup Language (XML) files, properties files, databases of rules, and other mechanisms.

In one example, the rules set 128 can be used to prevent undesirable or problematic strings from being added to software and/or software-related documentation at various phases or times during a software development life cycle. For example, the rules set 128 can be used by one or more processes, functions, drivers, etc. to validate strings before the strings are processed by language translation systems. Software that is being developed, updated, or maintained, for example, can contain strings that are to be translated to several locales, such as factories, distribution centers, etc. in different countries. Language translations may typically include the use of one or more commercial translation systems that send the files to translators according to their required locales. Enforcement of string policies using the rules set 128 can prevent adding special characters (e.g., any of !@#$%^*+, etc.) and undesirable abbreviations and initials from being used.

In another example, rules from the rules set 128 can be used to identify and correct special words and/or problematic terms. For example, using the rules can prevent the use of offensive words and/or words that are problematic in terms of cultures or languages (e.g., nova meaning "no va" or "no go" in Spanish). In another example, the rules can be used to identify and correct grammar, punctuation, spelling and typographical errors.

As used in the present disclosure, the term "computer" is intended to encompass any suitable processing device. For example, although FIG. 1 illustrates a single string policy enforcement system 110, the environment 100 can be implemented using two or more string policy enforcement systems 110, as well as computers other than servers, including a server pool. Indeed, the string policy enforcement system 110 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated string policy enforcement system 110 may be adapted to execute any operating system, including Linux, UNIX, Windows, Mac OS®, Java™, Android™, iOS or any other suitable operating system. According to some implementations, the string policy enforcement system 110 may also include, or be communicably coupled with, an e-mail server, a Web server, a caching server, a streaming data server, and/or other suitable server(s). In some implementations, components of the string policy enforcement systems 110 may be distributed in different locations and coupled using the network 102.

The string policy enforcement system 110 includes an interface 112, a processor 114, validation engine 116, a manual fix mechanism 120, an auto-fix mechanism 122, a reporting engine 124, and a memory 126. The interface 112 is used by the string policy enforcement system 110 for communicating with other systems in a distributed environment, connected to the network 102 (e.g., the client device 160), as well as other systems (not illustrated) communicably coupled to the network 102. Generally, the interface 112 comprises logic encoded in software and/or hardware in a suitable combination and operable to communicate with the network 102. More specifically, the interface 112 may comprise software supporting one or more communication protocols associated with communications such that the network 102 or interface's hardware is operable to communicate physical signals within and outside of the illustrated environment 100.

The validation engine 116 can be used, for example, to validate a document using at least the rules set 128 and/or other inputs. Some or all of the validation can occur automatically, e.g., without intervention from a person. In some implementations, the validation engine 116 can operate by processing an entire file, e.g., being passed course code, a word document, or some other formatted file. In some implementations, the validation engine 116 can operate by being invoked inside another application, e.g., as a plug-in, add-in or other such feature.

The auto-fix mechanism 122 can automatically correct errors, for example, that are detected by the validation engine 116. For example, the auto-fix mechanism 122 can include a correction mechanism that assures that the policies specified by rules set 128 are being kept, e.g., by filtering invalid strings and providing an appropriate fix. In some implementations, the auto-fix mechanism 122 can be an external component relative to the validation engine 116. For example, the auto-fix mechanism 122 can be run against a single file or a group of files. When the auto-fix mechanism 122 runs, for example, whenever a pattern or other feature in a string is recognized (e.g., using information from the rules set 128), the auto-fix mechanism 122 can propose an automatic fix. In some implementations, parameters, such as locale-based parameters can be used, so that automatic fixes that are made or proposed can be based on a specific culture, dialect, business area, etc.

In some implementations, the auto-fix mechanism 122 can be configured to execute in different ways, e.g., based on parameters that are set by a user. Example parameters, e.g., that are evaluated at initialization of the auto-fix mechanism 122, include a stop point feature and an automatic fixer switch. The stop point feature, for example, can designate whether or not to stop the auto-fix process when an undesirable string is recognized. For example, if the stop point feature is on, then the auto-fix process is set to stop if and when a string is detected that cannot be fixed by the auto-fix mechanism 122. When the stop point feature is off, for example, the auto-fix mechanism 122 can continue on, auto-fixing other strings in the same and subsequent files even after an undesirable string is recognized. Whether the stop point feature is on or off, the undesirable strings can be emphasized in some way, e.g., by highlighting within the document. Further, strings that are corrected (and those that cannot) can be identified in one or more reports. The automatic fixer switch of the auto-fix mechanism 122 can, for example, desinate whether to enable the auto fixer or leave strings to be fixed manually later on.

In some implementations, the auto-fix mechanism 122 can determine which specific rules from the rules set 128 are to be used for a document. For example, the file name of the document can contain a language indicator or some other indicator of what rules are to be used. In some implementations, metadata associated with each document can be used to identify the specific rules from the rules set 128 to be used to validate the file.

The manual fix mechanism 120 can include, for example, a user interface in which a document is presented to the user. The undesirable strings in the document can be emphasized in some way so that the user can easily locate the strings and make a correction. In some implementations, at least one suggested correction can also be presented to the user, and, upon selection of a control, a suggestion correction can be executed for the undesirable string.

The reporting engine 124 can produce reports that include information associated with documents that have been verified and the errors that have been detected and/or corrected. The reports may be generated on a scheduled basis or provided as needed in response to requests that are received.

The string policy enforcement system 110 also includes the memory 126, or multiple memories 126. The memory 126 may include any type of memory or database module and may take the form of volatile and/or non-volatile memory including, without limitation, magnetic media, optical media, random access memory (RAM), read-only memory (ROM), removable media, or any other suitable local or remote memory component. The memory 126 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the string policy enforcement system 110. Additionally, the memory 126 may include any other appropriate data, such as VPN applications, firmware logs and policies, firewall policies, a security or access log, print or other reporting files, as well as others. In some implementations, memory 126 includes the rules set 128 (described above). Other components within the memory 126 are possible.

The illustrated environment of FIG. 1 also includes the client device 160, or multiple client devices 160. The client device 160 may be any computing device operable to connect to, or communicate with, at least the string policy enforcement system 110 via the network 102 using a wire-line or wireless connection. In general, the client device 160 comprises an electronic computer device operable to receive, transmit, process, and store any appropriate data associated with the environment 100 of FIG. 1.

The illustrated client device 160 further includes a client application 166. The client application 166 is any type of application that allows the client device 160 to request and view content on the client device 160. In some implementations, the client application 166 can be and/or include a Web browser. In some implementations, the client application 166 can use parameters, metadata, and other information received at launch to access a particular set of data from the string policy enforcement system 110. Once a particular client application 166 is launched, a user may interactively process a task, event, or other information associated with the string policy enforcement system 110. Further, although illustrated as a single client application 166, the client application 166 may be implemented as multiple client applications in the client device 160. In some instances, the client device 160 may remotely manage settings and/or operations of the string policy enforcement system 110. In some instances, the client device 160 may perform development tasks associated with a particular piece of software or related documentation, where those tasks or operations cause changes to the software or documentation that may trigger the string policy enforcement system 110 to review the associated changes.

The illustrated client device 160 further includes an interface 162, a processor 164, and a memory 168. The interface 162 is used by the client device 160 for communicating with other systems in a distributed environment—including within the environment 100—connected to the network 102, e.g., the string policy enforcement system 110, as well as other systems communicably coupled to the network 102 (not illustrated). Generally, the interface 162 comprises logic encoded in software and/or hardware in a suitable combination and operable to communicate with the network 102. More specifically, the interface 162 may comprise software supporting one or more communication protocols associated with communications such that the network 102 or interface's hardware is operable to communicate physical signals within and outside of the illustrated environment 100.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

As illustrated in FIG. 1, the client device 160 includes the processor 164. Although illustrated as the single processor 164 in FIG. 1, two or more processors 164 may be used according to particular needs, desires, or particular implementations of the environment 100. Each processor 164 may be a central processing unit (CPU), an application specific integrated circuit (ASIC), a field-programmable gate array (FPGA), or another suitable component. Generally, the processor 164 executes instructions and manipulates data to perform the operations of the client device 160. Specifically, the processor 164 executes the functionality required to send requests to the string policy enforcement system 110 and to receive and process responses from the string policy enforcement system 110.

The illustrated client device 160 also includes a memory 168, or multiple memories 168. The memory 168 may include any memory or database module and may take the form of volatile or non-volatile memory including, without limitation, magnetic media, optical media, random access memory (RAM), read-only memory (ROM), removable media, or any other suitable local or remote memory component. The memory 168 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 160. Additionally, the memory 168 may include any other appropriate data, such as VPN applications, firmware logs and policies, firewall policies, a security or access log, print or other reporting files, as well as others.

The illustrated client device 160 is intended to encompass any computing device such as a smart phone, tablet computing device, PDA, desktop computer, laptop/notebook computer, wireless data port, one or more processors within these devices, or any other suitable processing device. For example, the client device 160 may comprise a computer that includes an input device, such as a keypad, touch screen, or other device that can accept user information, and an output device that conveys information associated with the operation of the string policy enforcement system 110 or the client device 160 itself, including digital data, visual information, or a graphical user interface (GUI) 170, as shown with respect to and included by the client device 160. The GUI 170 interfaces with at least a portion of the environment 100 for any suitable purpose, including generating a visual representation of a Web browser. In particular, the GUI 170 may be used to view and navigate various Web pages located both internally and externally to the string policy enforcement system 110.

Figure 2:
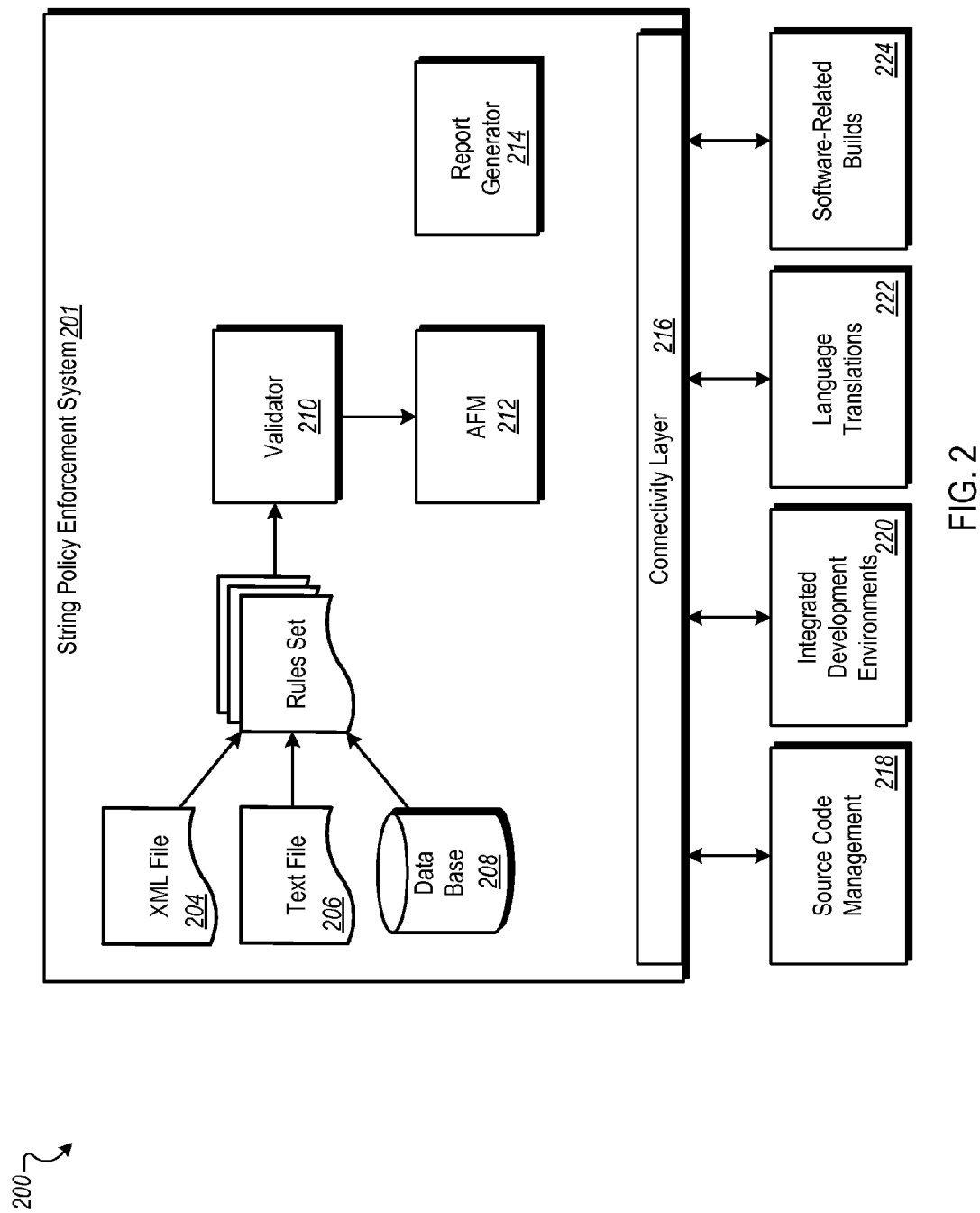
FIG. 2 is a block diagram illustrating an example architecture for a string policy enforcement system and entities with which it interacts.

FIG. 2 is a block diagram illustrating an example architecture 200 for a string policy enforcement system 201 and entities 203 with which it interacts. For example, the string policy enforcement system 201 can include similar or different components that are included with the string policy enforcement system 110 described above with reference to FIG. 1.

The string policy enforcement system 201 can include a rules set 202 that is used by a validator 210 for validating documents, such as described above for the rules set 128. In some implementations, the rules set 202 can include rules from different sources, including, for example, rules from XML files 204, text files 206 and/or data bases 208. Other sources for rules can be used. Some of the rules can be rules used for the detection and correction of grammar, punctuation, spelling and typographical errors. The rules can include rules that are associated with particular languages, including rules associated with words or terms that are problematic in certain business areas, cultures or languages. For example, there can be one or more rules associated with each of English, French, German, Spanish, and other languages, and each of the language-specific rules may designate words or terms that are not to be used. In a specific example, software or software-related documentation intended for use in a French warehouse may include a specific French word or term to be avoided, either in its current form or a form that is expected upon translation. One or more rules can identify the specific word or phrase, and can optionally include a replacement word or phrase, or instructions to delete the word or phrase. For example, an auto-fix mechanism 212 can correct the word or phrase based on instructions in the rules.

A report generator 214 can provide reports of words and phrases that are detected by the string policy enforcement system 201. In some implementations, the string policy enforcement system 201 can collect information from different steps of a validation process that is collectively performed by the validator 210, the auto-fix mechanism 212, and/or other components. Reports can provide statistics of various words and phrases that are being detected and corrected, and if possible, corrected automatically. The reports can also identify the source of problematic strings and phrases, e.g., identifying individual software engineers or other people who are using the words or phrases in their software and/or software-related documentation. In some implementations, the reports can be in the form of emails, text messages and/or other immediate electronic communications. For example, a notification in the form of an email or text message can be generated that informs someone of a detected undesirable string that cannot be corrected automatically and that may be delaying an overnight software build.

In some implementations, validation of documents performed by the string policy enforcement system 201 can be integrated within other systems, such as source code management 218, integrated development environments (IDEs) 220, language translation systems 222, and software-related builds 224. A connectivity layer 216 can provide an interface between the string policy enforcement system 201 and the other systems. In some implementations, the connectivity layer 216 can include a set of drivers, for example, that connect the string policy enforcement system 201 to other systems that use its services. In some implementations, the connectivity layer 216 can include application programming interfaces (APIs) for accessing the validation, auto-fix and reporting features. In some implementations, the connectivity layer 216 can be implemented as a file-based service that receives a file, validates the file, and returns the file to the corresponding system that sent the file. Other suitable ways can be used to access the string policy enforcement system 201.

Source code management systems 218, for example, can use services of the string policy enforcement system 201 to correct strings before they go into production. For example, before modified source code of a software-related document gets accepted as a new version, the document can be validated and the undesirable strings corrected.

Integrated development environments 220, for example, can include interfaces to the string policy enforcement system 201. For example, a software developer or technical writer can have access to a link or add-in for invoking validation of a work product, such as a piece of source code or some kind of software-related documentation (e.g., user manuals, training materials, context-sensitive help, installation notes, or other documents).

In some implementations, language translation systems 222 can use services of the string policy enforcement system 201 to assure a better pre-translation version of the document. For example, to save costs associated with translating documents, undesirable strings can be detected and either flagged or corrected automatically. In some implementations, validation can also be run at a post-translation time, e.g., to include rules that focus on undesirable strings that may be introduced during the translation.

Systems that perform software-related builds 224 can also use the services of the services of the string policy enforcement system 201. For example, one or more documents that are part of a build can be validated. In some implementations, a build can be postponed if one or more documents contain undesirable strings that cannot be corrected automatically or that need to be corrected manually before the build can proceed.

Another example use of the string policy enforcement system 201 can occur in the area of submitting and handling change requests. For example, if a user submits a change request, e.g., related to software or software-related documentation, a document that contains the proposed changes can be validated by the string policy enforcement system 201. The result can be to find and correct undesirable strings before an attempt is made to implement them.

Figure 3:
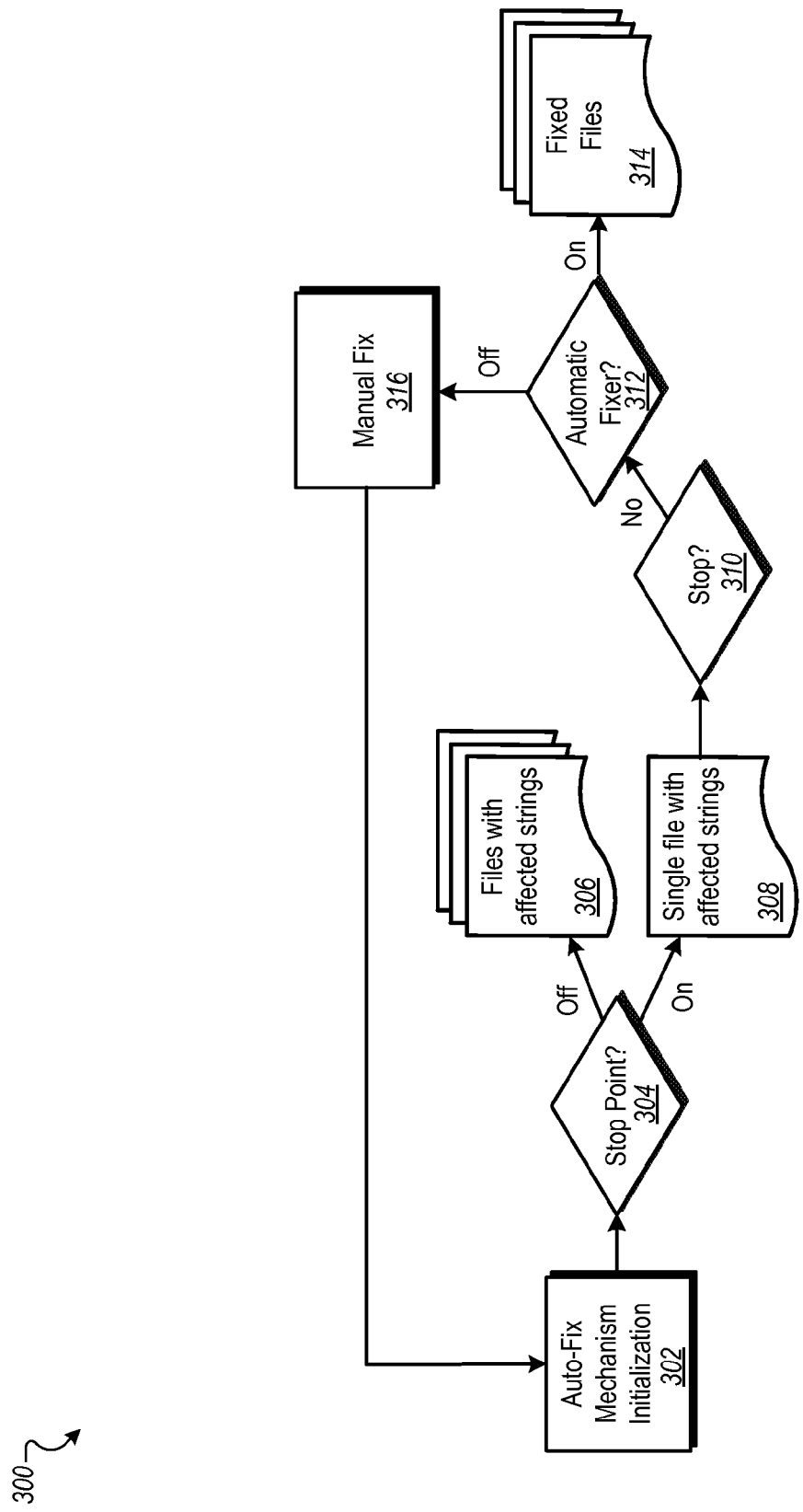
FIG. 3 is a flow diagram of an example sequence of steps for automatically correcting documents with undesirable strings.

FIG. 3 is a flow diagram of an example sequence of steps 300 for automatically correcting documents with undesirable strings. For example, the sequence of steps 300 can represent one possible logical flow for the auto-fix mechanisms 122 or 212, or some other auto-fix mechanism.

In an initialization step 302, e.g., when the auto-fix mechanism starts, parameters can be specified and/or received for controlling the execution of a process for automatically correcting a document. For example, if the auto-fix mechanism is being run for a set of documents such as software code for a software build, the parameters can specify how the process is to be run in order to enable a successful build and/or to prevent an unsuccessful build (e.g., one that incorporates undesirable strings into production). One example parameter is a stop point setting that defines, for example, whether to stop the process of validating a batch of documents when a single document that contains an undesirable string is recognized, or to continue on and check all documents in the batch without stopping. Another example parameter is an automatic fixer setting that defines, for example, whether to turn on an auto-fixer mechanism (e.g., auto-fix mechanism 122 or 212) or fix the string manually.

In an example flow of sequence of steps 300, during verification of multiple documents in a batch, some documents may be found to contain no undesirable strings. However, when a document with an undesirable string is found, it is determined at a stop point setting check 304 whether the stop point setting is on (e.g., enabled) or off. If the stop point setting is off, then over time, multiple files 306 can be created in which affected strings are identified. If the stop point setting is on, then a single file 308 is created in which affected strings are identified, and a stop event 310 can occur, where the stop event indicates that additional documents are not to be processed.

At an automatic fixer setting check 312, it is determined whether the automatic fixer setting is on (e.g., enabled) or off. If the automatic fixer setting is on, then files with undesirable strings (e.g., multiple files 306 or the single file 308) are corrected automatically, e.g., by the auto-fix mechanisms 122 or 212, resulting in fixed files 314. If the automatic fixer setting is off, then files with undesirable strings are to be corrected manually, e.g., in a manual fix step 316 either substantially immediately or at a later time.

Figure 4:
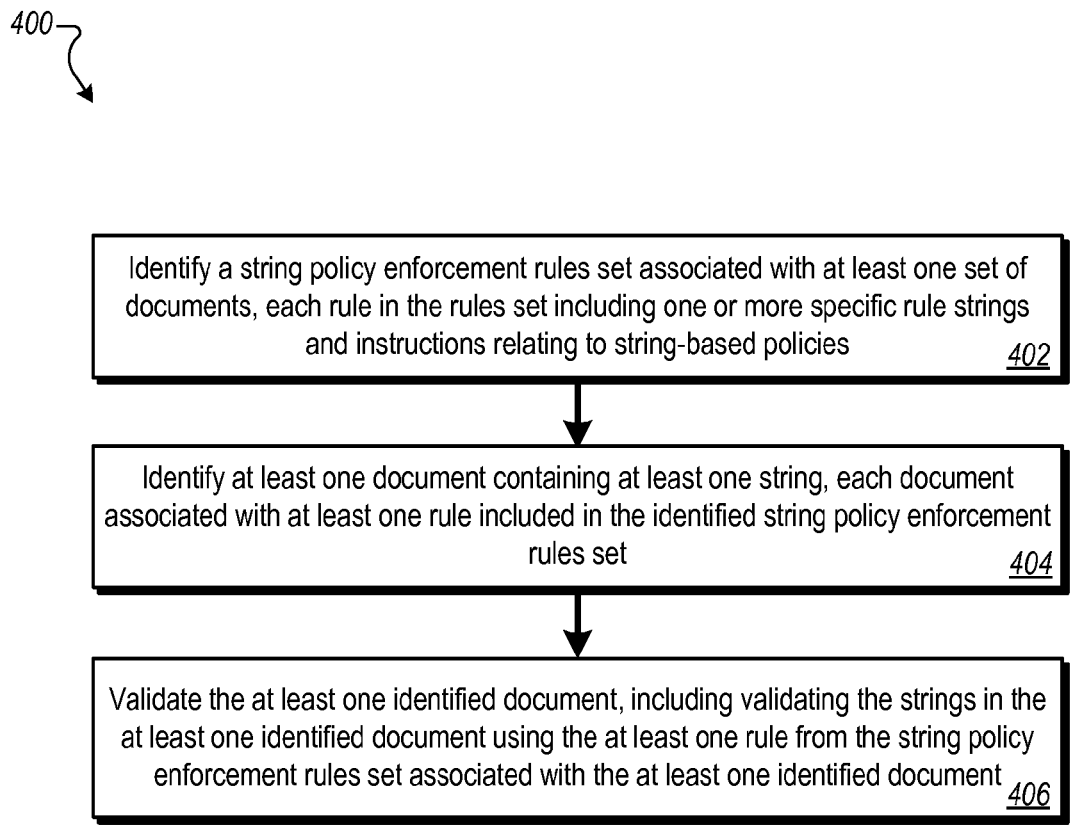
FIG. 4 is a flowchart of an example method for validating documents using a rules set.

FIG. 4 is a flowchart of an example method 400 for validating documents using a rules set. For clarity of presentation, the description that follows generally describes method 400 in the context of FIGS. 1 and 3. However, it will be understood that the method 400 may be performed, for example, by any other suitable system, environment, software, and hardware, or a combination of systems, environments, software, and hardware as appropriate. For example, the client device 160 and/or its components can be used to execute the method 400, e.g., using information accessed from the string policy enforcement system 110.

At 402, a string policy enforcement rules set associated with at least one set of documents is identified. Each rule in the rules set includes one or more specific rule strings and instructions relating to string-based policies. As an example, a rules set related to French translations can be identified for a set of software-related documents that are to be translated to French. Each rule in the rules set can correspond to one or more specific problematic strings.

At 404, the at least one document containing at least one string is identified. The at least one identified document is associated with at least one rule included in the identified string policy enforcement rules set. For example, one of the documents in the set can be identified and accessed that contains French-related strings to be corrected before translation, the strings asociated with specific rules in the rules set.

At 406, at least one identified document is validated. Validating the at least one identified document includes validating the strings in the at least one identified document using the at least one rule from the string policy enforcement rules set associated with the at least one identified document. In some implementations, validating the document can include updating the document automatically, including deleting, replacing or correcting an undesirable string in the document based at least on patterns defined in one or more rules in the rules set. For example, updating the document can occur when an auto-fix setting is enabled, such as described with respect to the automatic fixer setting check 312 and resulting in fixed files 314. Otherwise, when the on/off auto-fix setting is disabled, flagging an undesirable string for manual review (e.g., the manual fix step 316).

In some implementations, identifying the string policy enforcement rules set at 402 can include first identifying the at least one document containing the at least one string. Then identification of the string policy enforcement rules set can be based at least in part on the at least one document or metadata associated with the at least one document. For example, the validation process can access a document and, based on the document (e.g., a file name, extension and/or metadata associated with the document), determine that a particular rules set is to be used for validation.

In some implementations, the method 400 further comprises receiving an on/off stop setting for a stop command associated with validating the at least one identified document, and the stop command includes at least one stop condition associated with one or more strings in the document. When the on/off setting is on, the validating of the at least one identified document is terminated if at least one of the stop conditions is determined. For example, referring to FIG. 3, if the stop point setting is on and a document is dentified that includes an undesirable string, then the single file 308 is created and the stop event 310 occurs.

In some implementations, one or more of the at least one identified document can be separated into a first document and a second document, and each of the documents can be associated with a different rule from the string policy enforcement rule set. For example, a document that is a component of source code may be split into two or more sub-documents based on some criteria (e.g., structure, content, word patterns, etc.), and each sub-document can be validated using one or more rules appropriate for the sub-document.

The preceding figures and accompanying description illustrate example processes and computer implementable techniques. But example environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the steps in these processes may take place simultaneously, concurrently, in parallel, and/or in different orders than as shown. Moreover, example environment 100 may use processes with additional steps, fewer steps, and/or different steps, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method comprising:
   identifying a string policy enforcement rules set associated with at least one set of documents, each rule in the rules set including one or more specific rule strings and instructions relating to string-based policies, wherein each rule is associated with a particular document context, and wherein the one or more specific rule strings identify a set of predetermined terms identified as problematic in the associated particular document context;
   identifying at least one document containing at least one string, the at least one identified document associated with at least one rule included in the identified string policy enforcement rules set;
   identifying a document context associated with the identified at least one document;
   validating the at least one identified document based on the identified document context, wherein validating the at least one identified document includes validating the at least one string in the at least one identified document using the at least one rule from the string policy enforcement rules set corresponding to the identified document contexts;
   receiving an on/off stop setting for a stop command associated with validating the at least one identified document, the stop command including at least one stop condition associated with one or more strings in the document; and
   terminating the validating of the at least one identified document if at least one of the stop conditions is determined when the on/off stop setting is on.

2. The method of claim 1, wherein identifying the string policy enforcement rules set includes initially identifying the at least one document containing the at least one string, and wherein identification of the string policy enforcement rules set is based at least in part on the at least one document or metadata associated with the at least one document.

3. The method of claim 1 further comprising separating the at least one document into a first document and a second document, and wherein each of the first document and the second document is associated with a different rule from the string policy enforcement rule set.

4. The method of claim 1, wherein the documents include software and/or software-related documentation used in a software development life cycle.

5. The method of claim 1, wherein the string policy enforcement rules set includes rules from different sources, including rules from at least one of an Extensible Markup Language (XML) file, text file and/or data bases.

6. The method of claim 1, wherein the rules include rules related to detection and correction of grammar, punctuation, spelling and typographical errors.

7. The method of claim 1, wherein validating the at least one identified document is integrated within at least one other system selected from a group comprising source code management, integrated development environments, language translations, and software-related builds.

8. The method of claim 1 further comprising updating the document automatically when the validating identifies at least one undesirable string.

9. The method of claim 8, wherein updating the document automatically includes deleting, replacing or correcting an undesirable string in the document based at least on patterns defined in one or more rules in the rules set.

10. The method of claim 9 wherein updating the document occurs when an auto-fix setting is enabled, otherwise, when the auto-fix setting is disabled, flagging an undesirable string for manual review.

11. The method of claim 1, wherein the document context is associated with one or more of a specific culture, dialect or business area.

12. The method of claim 11, wherein the predetermined terms include words or terms in the one or more specific cultures, dialects, or business areas identified as at least one of the following:
    not to be used;
    undesirable or to be avoided;
    offensive;
    having an undesirable cultural meaning or translation;
    containing one or more pre-determined special characters; or
    containing undesirable abbreviations or initials.

13. A computer-program product, the computer program product comprising computer-readable instructions embodied on tangible, non-transitory media, the instructions operable when executed by at least one computer to:

identify a string policy enforcement rules set associated with at least one set of documents, each rule in the rules set including one or more specific rule strings and instructions relating to string-based policies, wherein each rule is associated with a particular document context, and wherein the one or more specific rule strings identify a set of predetermined terms identified as problematic in the associated particular document context;

identify at least one document containing at least one string, the at least one identified document associated with at least one rule included in the identified string policy enforcement rules set;

identify a document context associated with the identified at least one document;

validate the at least one identified document based on the identified document context, wherein validating the at least one identified document includes validating the at least one string in the at least one identified document using the at least one rule from the string policy enforcement rules set corresponding to the identified document contexts;

receiving an on/off stop setting for a stop command associated with validating the at least one identified document, the stop command including at least one stop condition associated with one or more strings in the document; and terminating the validating of the at least one identified document if at least one of the stop conditions is determined when the on/off stop setting is on.

14. The computer-program product of claim 13, wherein identifying the string policy enforcement rules set includes initially identifying the at least one document containing the at least one string, and wherein identification of the string policy enforcement rules set is based at least in part on the at least one document or metadata associated with the at least one document.

15. The computer-program product of claim 13, wherein the documents include software and/or software-related documentation used in a software development life cycle.

16. The computer-program product of claim 13, further comprising updating the document automatically when the validating identifies at least one undesirable string.

17. The computer-program product of claim 16, wherein updating the document automatically includes deleting, replacing or correcting an undesirable string in the document based at least on patterns defined in one or more rules in the rules set.

18. A system, comprising:

memory operable to store at least a string policy enforcement rules set associated with at least one set of documents, each rule in the rules set including one or more specific rule strings and instructions relating to string-based policies; and at least one hardware processor interoperably coupled to the memory and operable to perform instructions to:

identify a string policy enforcement rules set associated with at least one set of documents, each rule in the rules set including one or more specific rule strings and instructions relating to string-based policies, wherein each rule is associated with a particular document context, and wherein the one or more specific rule strings identify a set of predetermined terms identified as problematic in the associated particular document context;

identify at least one document containing at least one string, the at least one identified document associated with at least one rule included in the identified string policy enforcement rules set;

identify a document context associated with the identified at least one document;

validate the at least one identified document based on the identified document context, wherein validating the at least one identified document includes validating the at least one string in the at least one identified document using the at least one rule from the string policy enforcement rules set corresponding to the identified document context;

receive an on/off stop setting for a stop command associated with validating the at least one identified document, the stop command including at least one stop condition associated with one or more strings in the document; and terminate the validating of the at least one identified document if at least one of the stop conditions is determined when the on/off stop setting is on.

19. The system of claim 18, wherein identifying the string policy enforcement rules set includes initially identifying the at least one document containing the at least one string, and wherein identification of the string policy enforcement rules set is based at least in part on the at least one document or metadata associated with the at least one document.

* * * * *